United States Patent
Pradhan et al.

(10) Patent No.: US 11,628,855 B1
(45) Date of Patent: Apr. 18, 2023

(54) OBJECT VELOCITY DETECTION FROM MULTI-MODAL SENSOR DATA

(71) Applicant: Zoox, Inc., Foster City, CA (US)

(72) Inventors: Sabeek Mani Pradhan, Redwood City, CA (US); Cooper Stokes Sloan, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 367 days.

(21) Appl. No.: 16/866,839

(22) Filed: May 5, 2020

(51) Int. Cl.
*B60W 60/00* (2020.01)
*G05D 1/00* (2006.01)
*G01S 17/931* (2020.01)
*G01S 13/931* (2020.01)
*G05D 1/02* (2020.01)

(52) U.S. Cl.
CPC ......... *B60W 60/001* (2020.02); *G01S 13/931* (2013.01); *G01S 17/931* (2020.01); *G05D 1/0088* (2013.01); *G05D 1/0221* (2013.01); *G05D 2201/0213* (2013.01)

(58) Field of Classification Search
CPC .. B60W 60/001; G01S 13/931; G01S 17/931; G05D 1/0088; G05D 1/0221; G05D 2201/0213
USPC .............. 701/24, 28; 704/232, 259
See application file for complete search history.

(56) References Cited

U.S. PATENT DOCUMENTS

| | | | |
|---|---|---|---|
| 2019/0035101 A1* | 1/2019 | Kwant | G06V 20/588 |
| 2019/0147372 A1* | 5/2019 | Luo | G06V 10/82 706/20 |
| 2019/0156485 A1* | 5/2019 | Pfeiffer | G06V 20/56 |
| 2019/0266418 A1* | 8/2019 | Xu | G06V 10/457 |
| 2019/0340432 A1* | 11/2019 | Mousavian | G06V 10/255 |
| 2020/0150235 A1* | 5/2020 | Beijbom | G01S 7/4802 |

* cited by examiner

*Primary Examiner* — Elaine Gort
*Assistant Examiner* — Ellis B. Ramirez
(74) *Attorney, Agent, or Firm* — Lee & Hayes, P.C.

(57) ABSTRACT

Ground truth data may be too sparse to supervise training of a machine-learned (ML) model enough to achieve an ML model with sufficient accuracy/recall. For example, in some cases, ground truth data may only be available for every third, tenth, or hundredth frame of raw data. Training an ML model to detect a velocity of an object when ground truth data for training is sparse may comprise training the ML model to predict a future position of the object based at least in part on image, radar, and/or lidar data (e.g., for which no ground truth may be available). The ML model may be altered based at least in part on a difference between ground truth data associated with a future time and the future position.

20 Claims, 5 Drawing Sheets

OBJECT VELOCITY DETECTION FROM MULTI-MODAL SENSOR DATA

BACKGROUND

Computer vision is used in numerous applications, such as operating autonomous vehicles, identifying individuals for security purposes, etc. Computer vision techniques may include building software components that identify salient portions from an image, representing the salient portions of the image to the computer in a form that the computer can use to conduct further operations, and/or tracking objects. However, monocular images traditionally include two-dimensions of spatial data, lacking depth, scale, and/or other data.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

DETAILED DESCRIPTION

Figure 1:
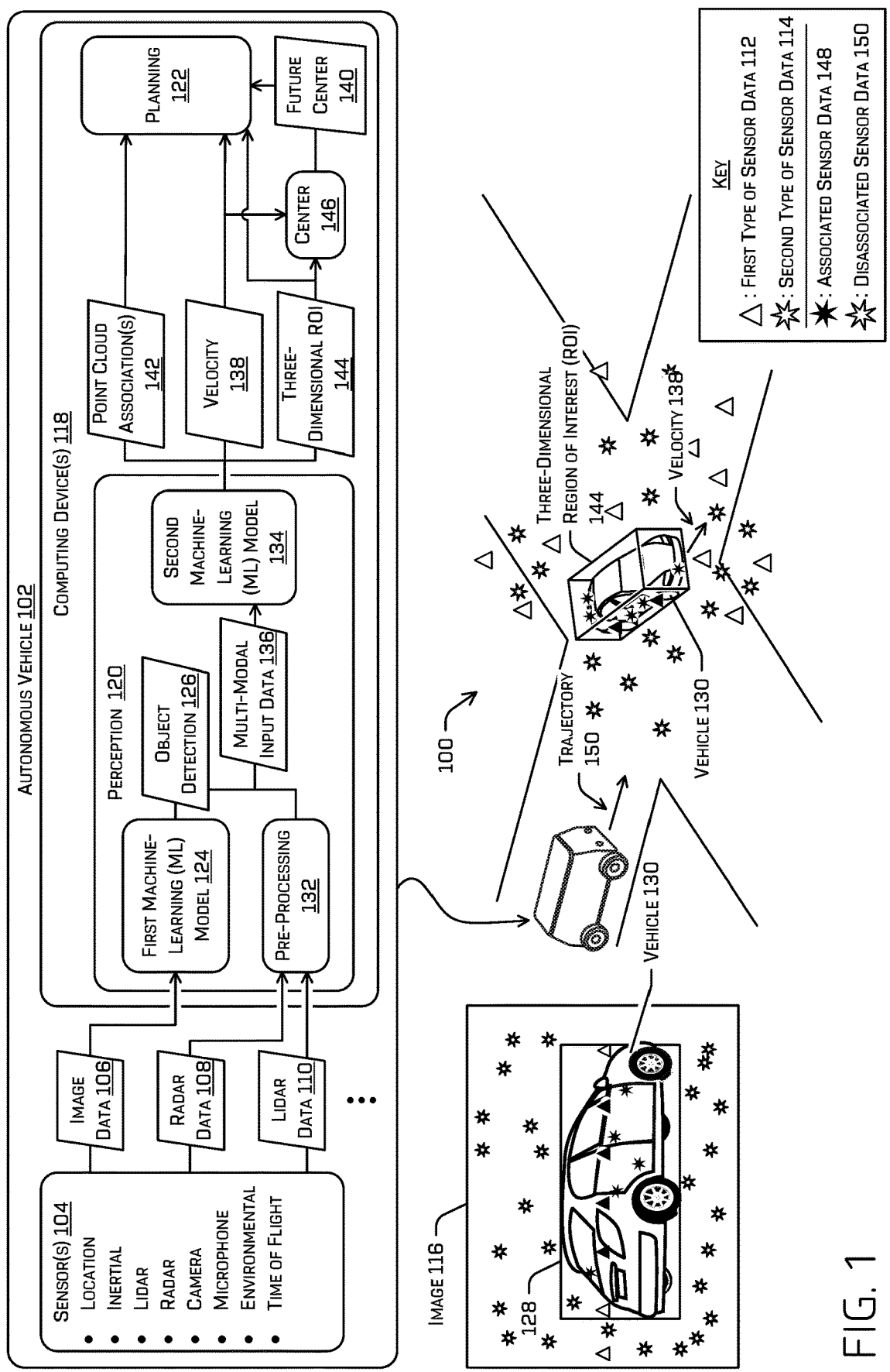
FIG. 1 illustrates an example scenario depicting an autonomous vehicle that comprises a machine-learned model trained to detect a velocity of an object based at least in part on image data and point cloud data from a lidar device and/or radar device.

The techniques discussed herein relate to detecting the velocity of an object based on input from a plurality of sensor modalities. Whereas some computer vision techniques output a two-dimensional location of an object in an image, the techniques discussed herein improve former techniques by outputting a velocity and/or center associated with the object detection (which may be a position in an environment expressed in two-, three-, or more dimensions) and/or associating the object detection with three-dimensional data associated with the space occupied by the object in an environment.

The techniques may comprise training a machine-learned (ML) model to detect a velocity and/or center of an object even when ground truth data for training is sparse. For example, ground truth data for training the ML model may be available for every third, tenth, hundredth, or even less instance of raw data. This means that the ML model may not be adequately supervised by the ground truth data to accurately learn to predict a velocity, a center, or other data associated with the object. The output of such an ML model may be inaccurate and may jitter—the center, velocity, and/or region of interest (ROI) generated by such an ML model may change in value rapidly, "jumping" around. To give a practical example, an autonomous vehicle incorporating such an ML model in a pipeline for controlling the autonomous vehicle may react late to events in an environment surrounding the autonomous vehicle due to the inaccuracy/jitter of the ML model output.

The ML model discussed herein may be trained to receive image and/or point cloud data associated with an object as input and determine/output a location of a center of the object and/or a velocity associated with the object. The ML model may additionally or alternatively determine a segmentation of the point cloud data and/or three-dimensional ROI associated with the object. Such an ML model is discussed in U.S. patent application Ser. No. 16/386,249, entitled "Multi-Model Sensor Data Association Architecture," incorporated in its entirety herein. The three-dimensional ROI may comprise a center, extent(s), and/or orientation (e.g., a yaw, pitch, and/or roll) that indicates an estimated volume occupied by the object.

Training the ML model to determine a velocity of an object, even when ground truth data is sparse, may comprise receiving first sensor data associated with a first time for which ground truth data may be unavailable. The ML model may determine a center of the object and an estimated velocity of the object based at least in part on the first sensor data. Training the ML model may include determining a future center of the object based at least in part on the estimated velocity and the center predicted by the ML model, where the future center indicates an estimated location of the center of the object at a second (future) time subsequent to the first time.

The techniques may comprise additionally receiving ground truth data associated with second sensor data and the second time. The ground truth data may indicate a center of the object at the second time, which may be part of a ground truth three-dimensional ROI, for example. Training the ML model may include determining a difference between the future center and the ground truth center and altering one or more parameters of the ML model to reduce the difference. Note that the future center is an estimate of the center of the object at the second time, but the future center is determined using the velocity estimated by the ML model from the first sensor data associated with the first time.

In at least a first example, the velocity and current center may be learned and the future center may be deterministically calculated (e.g., using discrete integration techniques, filters (e.g., Bayesian filters such as Kalman filters)). However, the techniques may additionally or alternatively be inverted. For example, the ML model may output a current center and an estimated future center in association with the first sensor data associated with the first time (i.e., the current center and the estimated future center may be learned), from which a velocity may be determined (i.e., the velocity may be deterministically calculated using the future center and/or current center output by the ML model such as, for example, using various finite difference techniques). In such an instance, training the ML model may comprise receiving the ground truth center associated with the second time, determining a difference between the ground truth center and the estimated future center, and altering one or more parameters of the ML model to reduce the difference.

In any such example, the output estimated center may be associated with an estimated time (either output from the model or fixed).

In some examples, the ML model may additionally or alternatively trained to determine the velocity (or future center) based at least in part on receiving a movement state associated with an object as input. For example, the object may have been classified as a pedestrian associated with the movement state "standing," "walking," "running," etc. by another component of a perception component of an autonomous vehicle (e.g., part of a computer vision component of the perception component). The ML model may be trained to receive such a classification and/or movement state as part of the input data for estimating the object velocity. In an additional or alternate example, the ML model may additionally or alternatively be trained to output the velocity based at least in part on Doppler measurement(s) associated with the object, key locomotor points of a pedestrian as input, such as an identification of an estimated location of a pedestrian's head, shoulder(s), elbow(s), waist, knee(s), feet, etc., and/or an ROI from a previous time step.

In some examples, ML model may receive an object detection based on image data and/or point cloud data from one or more types of sensors (e.g., lidar, radar) and determine a subset of the point cloud data to associate with the object detection and/or generate a three-dimensional ROI indicating a volume occupied by the object in space. In some examples, the ML architecture may be configured to receive at least two point clouds, where each point cloud is associated with a different type of sensor (e.g., one point cloud associated with data from one or more lidar sensors and one point cloud associated with one or more radar sensors). In some examples, image data and/or an image-based object detection may additionally or alternatively be provided as input the ML architecture. The point cloud associated with each sensor type may be generated from outputs of one or more sensors of that type (e.g., a point cloud may be generated for lidar data based on signal(s) received from one or more lidar sensors). In at least one example, the ML architecture discussed herein may be trained on at least image data, lidar data, and/or radar data, although in another example the ML architecture may be trained on image data and lidar data.

In an example where two different types of sensors are employed (regardless of the number of sensors of a particular type), the ML architecture may be configured to receive first sensor data associated with a first type of sensor and second sensor data associated with a second type of sensor, and to output a first point in/out map associated with the first sensor data (e.g., a map indicative of which subset of sensor data is associated with the object or not) and a second point in/out map associated with the second sensor data. Although the discussion herein predominantly discusses two types of sensor data, it is contemplated that the techniques may apply to three or more sensor data types. However, solely for the sake of simplicity and clarity, the ML model discussed herein receives two sensor data types.

The techniques discussed herein may increase the amount of data made available to a planning component that controls a machine, such as an autonomous vehicle, based at least in part on the velocity, future center, point cloud segmentation, and/or three-dimensional ROI output by the ML model. For example, the ML architecture may output a velocity associated with an image-based object detection, which other ML architectures do not do. Additionally or alternatively, the planning component (or a component of a perception component) may determine whether to associate any of a number of different kinds of sensor data with an object detection associated with an image. In some examples, the perception component may determine a track in association with an object detection, where the track may comprise a current, predicted, and/or historical position, heading, velocity, acceleration, distance, ROI(s), and/or center of the object, as represented in image. The track may be extended to include current, predicted, and/or historical velocity and/or point cloud data based at least in part on the subset of points of one or more point clouds, as identified by or based on the segmentation, and/or the three-dimensional ROI output by the ML architecture discussed herein.

The techniques discussed herein may improve the safety of system(s) that integrate the techniques discussed herein. For example, by implementing the techniques discussed herein as a sub-system of an autonomous vehicle, the autonomous vehicle may operate more safely and/or efficiently. The techniques may comprise controlling operation of the autonomous vehicle based at least in part on the velocity and/or future center associated with the object output by the ML architecture discussed herein.

Example Scenario

FIG. 1 illustrates an example scenario 100 including a vehicle 102. In some instances, the vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 102 may be a fully or partially autonomous vehicle having any other level or classification. It is contemplated that the techniques discussed herein may apply to more than robotic control, such as for autonomous vehicles. For example, the techniques discussed herein may be applied to mining, manufacturing, augmented reality, etc. Moreover, even though the vehicle 102 is depicted as a land vehicle, vehicle 102 may be a spacecraft, watercraft, and/or the like. In some examples, vehicle 102 may be represented in a simulation as a simulated vehicle. For simplicity, the discussion herein does not distinguish between a simulated vehicle and a real-world vehicle. References to a "vehicle" may therefore reference a simulated and/or a real-world vehicle.

According to the techniques discussed herein, the vehicle 102 may receive sensor data from sensor(s) 104 of the vehicle 102. For example, the sensor(s) 104 may include a location sensor (e.g., a global positioning system (GPS) sensor), an inertia sensor (e.g., an accelerometer sensor, a gyroscope sensor, etc.), a magnetic field sensor (e.g., a compass), a position/velocity/acceleration sensor (e.g., a speedometer, a drive system sensor), a depth position sensor (e.g., a lidar sensor, a radar sensor, a sonar sensor, a time of flight (ToF) camera, a depth camera, an ultrasonic, and/or sonar sensor, and/or other depth-sensing sensor), an image sensor (e.g., a camera), an audio sensor (e.g., a microphone), and/or environmental sensor (e.g., a barometer, a hygrometer, etc.).

In at least one example, the sensor data may comprise at least image data 106 and data that may be represented as a point cloud, which may be received from one or more types of sensors. For example, sensor data that may be represented as a point cloud may include radar data 108, lidar data 110, and/or any other sensor data from which a point cloud may be constructed, such as ToF data, ultrasonic data, stereo camera data, etc. Sensors from which point clouds may be generated may be configured to measure a depth from the sensor to a surface and/or infer such a depth, as in the case of stereo cameras. A point of a point cloud may be a three (or more)-dimensional point that corresponds to a discrete location in the environment surrounding the autonomous vehicle. Points of the point cloud may be represented using any of a variety of coordinate systems (e.g., Euclidean, polar, spherical, cylindrical). However, it is contemplated that a point of the point cloud may comprise less than three dimensions in some instances (e.g., where one dimension is assumed, a two-dimensional plane is being scanned for objects).

FIG. 1 illustrates a first point cloud of a first type of sensor data 112 (e.g., radar data 108) represented as triangles, a second point cloud of a second type of sensor data 114 (e.g. lidar data 110) represented as stars, and an image 116 that is an example of image data 106. In some examples, a point cloud may comprise between one and thousands or even hundreds of thousands of points, therefore it is understood that the illustrated point clouds are merely a small portion of the potential number of points that may be received from sensor(s) 104. In an additional or alternate example, sensor data received from different sensor types may be combined into a single point cloud.

In some examples, the autonomous vehicle 102 may include computing device(s) 118 that may include a perception component 120 and/or a planning component 122, all or some of which may receive sensor data from sensor(s) 104. The sensor(s) 104 may generate sensor data, which may be received by computing device(s) 118. However, in other examples, some or all of the sensor(s) 104 and/or computing device(s) 118 may be separate from and/or disposed remotely from the vehicle 102 and data capture, processing, commands, and/or controls may be communicated to/from the vehicle 102 by one or more remote computing devices via wired and/or wireless networks.

In general, the perception component 120 may determine what is in the environment surrounding the autonomous vehicle 102 and the planning component 122 may determine how to operate the autonomous vehicle 102 according to information received from the perception component 120 regarding the environment. The perception component 120 may include one or more ML models and/or other computer-executable instructions for detecting, identifying, segmenting, classifying, and/or tracking objects from sensor data collected from the environment of the autonomous vehicle 102. For example, the perception component 120 may comprise the ML architecture discussed herein for determining a velocity and/or future center associated with an object. The ML architecture may additionally or alternatively determine a subset of point cloud points and/or three-dimensional ROI to associate with an object detection.

The ML models discussed herein may include a neural network, such as a random forest and/or boosted ensemble of decision trees; a directed acyclic graph (DAG) (e.g., where the nodes are organized as a Bayesian network); deep learning algorithm(s), such as artificial neural networks (ANN) (e.g., recurrent neural network (RNN), 'residual neural network (ResNet)), deep belief network (DBN), deep stacking network (DSN); etc.

In some examples, a first ML model 124 of the perception component 120 may be trained to receive sensor data from sensor(s) 104 of the autonomous vehicle 102 and output an object detection 126 for any objects in the environment that correspond with classification for which the first ML model 124 has been trained. For example, the first ML model 124 may be a computer vision component that detects objects from image data 106 and outputs the object detection 126 to identify a representation of the object within an image and/or the object's relation to the autonomous vehicle (e.g., a spatial relation). In some examples, the object detection 126 may comprise an ROI associated with the object's representation in an image (e.g., a rectangle encompassing the representation of the object in the image comprising a center, extent, and/or orientation (e.g., a yaw in some examples, and/or a roll and/or pitch); a mask identifying salient pixels or other portions of the image associated with the object), a classification associated with the object (e.g., pedestrian, vehicle, cyclist, traffic signage, blocking vehicle), key locomotor points of a pedestrian (e.g., head, shoulder, waist, elbow, wrist, knee, foot) or other articulating object, a movement state associated with an object (e.g., walking, running, standing, sitting, lying), depth estimate and/or depth probability distribution associated with the ROI, a segmentation associated with the representation of the object in an image (e.g., a semantic segmentation), and/or any other computer vision information related to the representation of the object in an image and/or the spatial data about the object that may be inferred from the image.

In the illustrated example, the first ML model 124 may receive image 116 and generate ROI 128, which is a two-dimensional ROI, as part of an object detection 126 associated with vehicle 130.

In some examples, the first ML model 124 may additionally or alternatively determine a track of the object. In some examples, the track may associate a current detected position of an object and a previously detected position of an object and/or a current, predicted, and/or historical position, heading, velocity, acceleration, distance, ROI(s), and/or center of the object. The track may thereby be an indication that the first ML model 124 is identifying two object detections as corresponding to a same object.

In some examples, the perception component 120 may additionally or alternatively comprise a pre-processing component 132 that receives sensor data from the sensor(s) 104. In some examples, the pre-processing component 132 may comprise software and/or hardware that receives signal(s) from depth-sensing sensors such as, for example, a radar sensor, lidar sensor, and/or other type of depth sensor. Generally, the pre-processing component 132 may be configured to preliminarily generate point clouds from signals received from the depth sensors, determine a subset of the point clouds to associate with each object detection 126 generated by the first ML model 124, and/or translate coordinates of the subset from a sensor coordinate space to an image space and/or a modified image space where a "z-axis" of the image space extends through a center of an ROI of the object detection and the "x-" and "y-" axes. These subsets may be provided to a second ML model 134 as part of multi-modal input data 136.

The second ML model 134 may comprise the ML architecture discussed herein. Where the second ML model 134 is configured to receive m number of types of point cloud data and the first ML model 124 outputs n object detections, where m and n are positive integers, pre-processing component 132 may be configured to output m subsets of point cloud data per object detection, resulting in a total number of m·n outputs in at least one example. Other configurations are contemplated where the output subsets may be aggregated together and/or the total number of outputs may be (m+1)n where the spatial data of different types of sensor data is aggregated together and forms a first input and the non-spatial data of the different sensor types forms m inputs.

For example, for each object detection, an accumulated point cloud comprising lidar and radar points may be provided as a first input, non-spatial lidar and/or image data may be provided as a second input, and/or non-spatial radar and/or image data may be provided as a third input to second ML model 134.

In some instances, the signal received at the pre-processing component 132 from a type of sensor may comprise a signal from one or more sensors. For example, the autonomous vehicle 102 may include multiple lidar sensors, one or more of which that may provide a signal to the pre-processing component 132. The pre-processing component 132 may generate a point cloud in association with each type of sensor. In some examples, the pre-processing component 132 may combine the point clouds of different types of sensors into a single point cloud, although in other examples, the pre-processing component 132 may separate and/or identify points of a point cloud according to sensor type.

In some examples, generating a point cloud may be based at least in part on depth measurements received from one or more sensors, where an individual point in the point cloud represents a discrete location in the environment surveyed by the sensor. In some examples, an individual point of a point cloud may be represented as a point in a Euclidean, polar, spherical, etc. space representing the environment surrounding the sensor or towards which a sensor was oriented at the time a measurement was taken, whereas an ROI may comprise a bounding box that comprises a center, extent, offsets, and/or orientation in an image space.

In some examples, radar data may be two-dimensional—radar data may indicate a scanning angle (i.e., an azimuth) and a depth, but lack a "height" (i.e., an altitude)—although some types of radar devices may output a three-dimensional measurement or a measurement capable of conversion to a three-dimensional measurement. To generate a three-dimensional point for use by the ML architecture discussed herein, the pre-processing component 132 may receive an object detection 126 from the first ML model 124 (and/or retrieve the object detection 126 from memory), translate the scanning angle of the radar data into a horizontal value in image space (e.g., an "x" value in Euclidean space), and determining a subset of radar data having horizontal values that intersect the object detection. The pre-processing component 132 may set a vertical value (e.g., a "y" value in Euclidean space) of the translated radar data to equal a vertical value of a center of the object detection (e.g., a center indicated by an ROI), although it is contemplated that any other point in the object detection may be used so long as the point used is consistent. In some instances, where multiple objects are detected in an image and the pre-processing component 132 therefore receives multiple object detections, it is possible that a radar point may be included in different subsets provided to the second ML model 134 and/or the radar point may have a different vertical value for each object detection 126 associated therewith. The training of the second ML model 134 configures the second ML model 134 to disambiguate the appropriate object with which to associate such a radar point, so redundantly including the radar point, but with different vertical values between two subsets, doesn't create an issue.

In some examples, the pre-processing component 132 may identify a subset of point cloud points to provide to the second ML model 134 based at least in part on projecting the point cloud into an image space associated with the image (e.g., projecting lidar points and/or radar points into image coordinates), or otherwise selecting the points which fall inside the bounds of the detected object (thereby removing the necessity to project onto an image plane). This may include projecting three-dimensional points into two-dimensional projected points (i.e., projections). The pre-processing component 132 may identify, as the subset, the points of the point cloud that correspond to projections thereof that lie within the extents of the object detection (e.g., the points corresponding to projections that lie within an ROI), as discussed in more detail in U.S. patent application Ser. No. 15/797,573, filed Oct. 30, 2017, the entirety of which is incorporated herein by reference.

Once subsets of point clouds have been associated with an object detection 126, the subsets and the object detection 126 may be provided as input to the second ML model 134 as part of the multi-modal input data 136. In some examples, the subsets provided as input to the second ML model 134 may be translated into coordinates of a modified image space comprising three dimensions (e.g., a Euclidean space), where two dimensions correspond to pixels of the object detection and a third dimension corresponds to depth (e.g., a "z-axis"). In some examples, the modified image space may be defined to have an origin at the image sensor and have a "z-axis" that extends through a center of an ROI of the object detection. In some examples, coordinates of a point of a subset may be translated from the space in which the sensor represented the points (and/or the pre-processor represented the points) to the modified image space. For example, the point cloud sensor space may indicate points in a point cloud by coordinates relative to a space having an origin defined at the sensor, whereas translating those coordinates into the modified image space may represent the points relative to the space as defined above (e.g., having an origin at the image sensor, "x-axis" and/or "y-axis" oriented to lie orthogonally to an orientation of pixels of the image and/or orthogonally to a two-dimensional ROI, and/or a "z-axis" that extends through a center of a two-dimensional ROI associated with the object detection.

In some examples, the second ML model 134 may comprise a pipeline per type of point cloud sensor type. So, where in an example where the second ML model 134 is trained to output a velocity associated with an object based on lidar and radar data, the second ML model 134 may comprise two pipelines. It is contemplated that the second ML model 134 may comprise more or less pipelines (e.g., 1, 3, 5). In such an example, each pipeline may receive spatial and/or non-spatial data associated with the respective sensor type. In an additional or alternate example, the second ML model 134 may comprise one pipeline for combined spatial data (e.g., an accumulated point cloud of all the depth sensors' data, so both lidar and radar points in the example above) plus one pipeline per sensor type to handle each sensor's non-spatial data (e.g., radar cross section (RCS), doppler, doppler variance, SNR, and/or range top-down segmentation box, semantic segmentation, instance segmentation, object classification associated with the object detection and/or a pixel thereof, and/or ROI orientation (e.g., yaw)). The multi-modal input data 136 may additionally or alternatively comprise non-spatial information. Of course, the second ML model 134 may comprise multiple models each receiving differing input and providing an associated output and/or one or more models having multiple heads. In at least some examples in which multiple output heads are used, the model may improve output associated with one modality based on parameters of a shared portion of the model learn from various other sensor modalities.

The second ML model 134 may be trained to output, in association with object detection 126, a velocity 138, future center 140, point cloud association(s) 142, and/or a three-dimensional ROI 144. For example, the velocity 138 may comprise a speed and/or direction of the vehicle 130 within the environment surrounding the vehicle 102. In some examples, a center component 146 may compute the future center 140 based at least in part on the velocity 138 and a current center indicated by the three-dimensional ROI 144. For example, the center component 146 may determine the future center 140 based at least in part on a frequency at which sensor data is received. The future center may be calculated based on the current center and the distance and direction traveled at the velocity 138 over the time interval specified by the rate at which sensor data is received. Of course, higher order estimates are contemplated, such as, for example, by taking into account accelerations, jerks, higher order terms represented in the track, rotations, etc. In some examples, the center may be a center of gravity, a geometric center of the three-dimensional ROI 144, and/or the like.

Note that although FIG. 1 depicts the second ML model 134 as outputting velocity 138, point cloud association(s) 142, and three-dimension ROI 144, the second ML model 134 could additionally or alternatively estimate the future center 140, point cloud association(s) 142, and three-dimensional ROI 144. In the latter example, the computing device(s) 118 may comprise a velocity component that determines the velocity 138 by determining the change in position between the future center 140 and the current center indicated by the three-dimensional ROI 144 over the time interval between sensor data captures. As above, such changes may include any various higher order terms or fits based on additional data that may be used from the associated track of the object 126.

The point cloud association(s) 142 identify a subset of point cloud data that is attributable to the object/object detection 126 for each type of depth-sensing sensor for which the second ML model 134 is trained. In the depicted example, a point cloud association may have been generated in association with ROI 144. Sensor data that is identified by the point cloud association as being associated with the vehicle 130 is shaded (148), whereas sensor data that is not identified by the point cloud association as being associated with the vehicle remains unshaded (150). In some examples, the perception component 120 may determine whether to associate sensor data with an object detection based at least in part on a probability associated with the point meeting or exceeding a threshold probability.

Though omitted FIG. 1 for clarity and as otherwise noted above, the second machine learning model 134 may additionally or alternatively receive any other data derived from the sensor data including, but not limited to, track data (e.g., indicating a previous, current, and/or predicted object position, velocity, acceleration, heading), classification data, doppler measurements (or estimates, regressions, etc.) associated with the object, and/or any other perception data.

In some instances, the perception component 120 may additionally or alternatively determine a position of the autonomous vehicle 102 determined by a localization component (not pictured, which may use any sensor data to localize the autonomous vehicle 102 within the environment), data related to objects in the vicinity of the autonomous vehicle 102, route data that specifies a destination of the vehicle, global map data that identifies characteristics of roadways (e.g., features detectable in different sensor modalities useful for localizing the autonomous vehicle), local map data that identifies characteristics detected in proximity to the vehicle (e.g., locations and/or dimensions of buildings, trees, fences, fire hydrants, stop signs, and any other feature detectable in various sensor modalities), etc. The data produced by the perception component 120 (including the output(s) of the first ML model 124 and/or the second ML model 134) may be collectively referred to as "perception data." Once the perception component 120 has generated perception data, the perception component 120 may transmit at least part of the perception data, including the velocity 138, future center 140, object detection 126, point cloud association(s) 142, and/or three-dimensional ROI 144, to the planning component 122.

In some instances, the planning component 122 may use perception data, including the object detection 126, velocity 138, future center 140, point cloud association(s) 142, and/or three-dimensional ROI 144, to generate instructions for controlling operation of the autonomous vehicle 102. For example, the planning component 122 may determine a route for the autonomous vehicle 102 from a first location to a second location; generate, substantially simultaneously, a plurality of potential trajectories for controlling motion of the autonomous vehicle 102 in accordance with a receding horizon technique (e.g., 1 micro-second, half a second) and based at least in part on an ROI and/or track to control the vehicle to traverse the route (e.g., in order to avoid any of the detected objects, as well as incorporate predictions of where such objects may be at points in the future); and select one of the potential trajectories as a trajectory 152 of the autonomous vehicle 102 that may be used to generate a drive control signal that may be transmitted to drive components of the autonomous vehicle 102.

FIG. 1 depicts an example of such a trajectory 152, represented as an arrow indicating a heading, velocity, and/or acceleration, although the trajectory itself may comprise instructions for controller(s) (e.g., PID controller(s)) of the autonomous vehicle 102 to actuate drive components of the vehicle 102 to effectuate a steering angle and/or steering rate. Actuation of the drive components may result in a vehicle position, vehicle velocity, and/or vehicle acceleration that tracks the trajectory generated planning component 122. For example, the trajectory 152 may comprise a target heading, target steering angle, target steering rate, target position, target velocity, and/or target acceleration for the controller(s) to track as part of the path.

Example System

Figure 2:
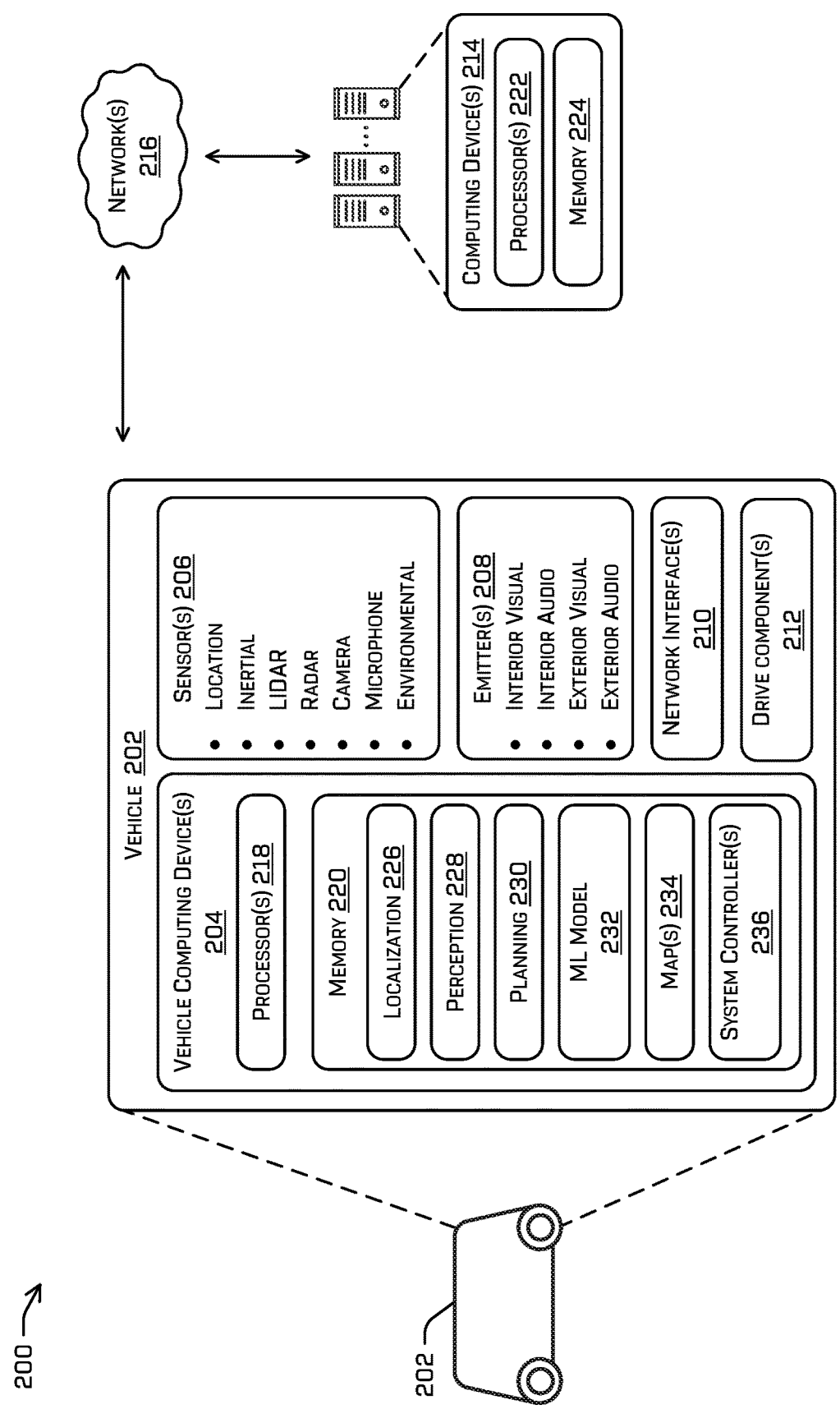
FIG. 2 illustrates a block diagram of an example architecture for training a machine-learned model to detect a velocity of an object based at least in part on image data and/or point cloud data when ground truth data is sparse.

FIG. 2 illustrates a block diagram of an example system 200 that implements the techniques discussed herein. In some instances, the example system 200 may include a vehicle 202, which may represent the vehicle 102 in FIG. 1. In some instances, the vehicle 202 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 202 may be a fully or partially autonomous vehicle having any other level or classification. Moreover, in some instances, the techniques described herein may be usable by non-autonomous vehicles as well.

The vehicle 202 may include a vehicle computing device(s) 204, sensor(s) 206, emitter(s) 208, network interface(s) 210, and/or drive component(s) 212. Vehicle computing device(s) 204 may represent computing device(s) 106 and sensor(s) 206 may represent sensor(s) 104. The system 200 may additionally or alternatively comprise computing device(s) 214.

In some instances, the sensor(s) 206 may represent sensor(s) 104 and may include lidar sensors, radar sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors, etc.), etc. The sensor(s) 206 may include multiple instances of each of these or other types of sensors. For instance, the radar sensors may include individual radar sensors located at the corners, front, back, sides, and/or top of the vehicle 202. As another example, the cameras may include multiple cameras disposed at various locations about the exterior and/or interior of the vehicle 202. The sensor(s) 206 may provide input to the vehicle computing device(s) 204 and/or to computing device(s) 214.

The vehicle 202 may also include emitter(s) 208 for emitting light and/or sound, as described above. The emitter(s) 208 in this example may include interior audio and visual emitter(s) to communicate with passengers of the vehicle 202. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 208 in this example may also include exterior emitter(s). By way of example and not limitation, the exterior emitter(s) in this example include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 202 may also include network interface(s) 210 that enable communication between the vehicle 202 and one or more other local or remote computing device(s). For instance, the network interface(s) 210 may facilitate communication with other local computing device(s) on the vehicle 202 and/or the drive component(s) 212. Also, the network interface (s) 210 may additionally or alternatively allow the vehicle to communicate with other nearby computing device(s) (e.g., other nearby vehicles, traffic signals, etc.). The network interface(s) 210 may additionally or alternatively enable the vehicle 202 to communicate with computing device(s) 214. In some examples, computing device(s) 214 may comprise one or more nodes of a distributed computing system (e.g., a cloud computing architecture).

The network interface(s) 210 may include physical and/or logical interfaces for connecting the vehicle computing device(s) 204 to another computing device or a network, such as network(s) 216. For example, the network interface(s) 210 may enable Wi-Fi-based communication such as via frequencies defined by the IEEE 200.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s). In some instances, the vehicle computing device(s) 204 and/or the sensor(s) 206 may send sensor data, via the network(s) 216, to the computing device(s) 214 at a particular frequency, after a lapse of a predetermined period of time, in near real-time, etc.

In some instances, the vehicle 202 may include one or more drive components 212. In some instances, the vehicle 202 may have a single drive component 212. In some instances, the drive component(s) 212 may include one or more sensors to detect conditions of the drive component(s) 212 and/or the surroundings of the vehicle 202. By way of example and not limitation, the sensor(s) of the drive component(s) 212 may include one or more wheel encoders (e.g., rotary encoders) to sense rotation of the wheels of the drive components, inertial sensors (e.g., inertial measurement units, accelerometers, gyroscopes, magnetometers, etc.) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive component(s) 212. In some cases, the sensor(s) on the drive component(s) 212 may overlap or supplement corresponding systems of the vehicle 202 (e.g., sensor(s) 206).

The drive component(s) 212 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 212 may include a drive component controller which may receive and preprocess data from the sensor(s) and to control operation of the various vehicle systems. In some instances, the drive component controller may include one or more processors and memory communicatively coupled with the one or more processors. The memory may store one or more components to perform various functionalities of the drive component(s) 212. Furthermore, the drive component(s) 212 may also include one or more communication connection(s) that enable communication by the respective drive component with one or more other local or remote computing device(s).

The vehicle computing device(s) 204 may include processor(s) 218 and memory 220 communicatively coupled with the one or more processors 218. Computing device(s) 214 may also include processor(s) 222, and/or memory 224. The processor(s) 218 and/or 222 may be any suitable processor capable of executing instructions to process data and perform operations as described herein. By way of example and not limitation, the processor(s) 218 and/or 222 may comprise one or more central processing units (CPUs), graphics processing units (GPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 220 and/or 224 may be examples of non-transitory computer-readable media. The memory 220 and/or 224 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 220 and/or memory 224 may store a localization component 226, perception component 228, planning component 230, ML model 232, map(s) 234, and/or system controller(s) 236. Perception component 228 may represent perception component 120, planning component 230 may represent planning component 122, and ML model 232 may represent second ML model 134.

In at least one example, the localization component 226 may include hardware and/or software to receive data from the sensor(s) 206 to determine a position, velocity, and/or orientation of the vehicle 202 (e.g., one or more of an x-, y-, z-position, roll, pitch, or yaw). For example, the localization component 226 may include and/or request/receive map(s) 234 of an environment and can continuously determine a location, velocity, and/or orientation of the autonomous vehicle within the map(s) 234. In some instances, the localization component 226 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some instances, the localization component 226 may provide data to various components of the vehicle 202 to determine an initial position of an autonomous vehicle for generating a trajectory and/or for generating map data, as discussed herein. In some examples, localization component 226 may provide, to the perception component 228, a location and/or orientation of the vehicle 202 relative to the environment and/or sensor data associated therewith.

In some instances, perception component 228 may comprise a primary perception system and/or a prediction system implemented in hardware and/or software. The perception component 228 may detect object(s) in in an environment surrounding the vehicle 202 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, and/or acceleration associated with an object), and/or the like. Data determined by the perception component 228 is referred to as perception data.

The planning component 230 may receive a location and/or orientation of the vehicle 202 from the localization component 226 and/or perception data from the perception component 228 and may determine instructions for controlling operation of the vehicle 202 based at least in part on any of this data. In some examples, determining the instructions may comprise determining the instructions based at least in part on a format associated with a system with which the instructions are associated (e.g., first instructions for controlling motion of the autonomous vehicle may be formatted in a first format of messages and/or signals (e.g., analog, digital, pneumatic, kinematic) that the system controller(s) 236 and/or drive component(s) 212 may parse/cause to be carried out, second instructions for the emitter(s) 208 may be formatted according to a second format associated therewith).

The ML model 232 may operate on the vehicle 202 and/or on the computing device(s) 214. For example, the computing device(s) 214 may receive sensor data from the vehicle 202, train the ML model 232, and transmit the ML model to the vehicle 202. In some examples, the vehicle 202 may configure the ML model 232 to be upstream from (provide input to) the planning component 230 in a pipeline and downstream (receive input) from at least some components of the perception component 228, although the ML model 232 may be upstream from at least some components of the perception component 228. The ML model 232 may be configured to pass all, part, or none of the output of the ML model 232 to the planning component 230. In some examples, the ML model 232 may be part of the perception component 228. The ML model 232 may be configured to output a velocity, future center, sensor data segmentation, and/or three-dimensional ROI, as discussed herein, which the planning component 230 may use to generate a trajectory. The architecture of the ML model 232 is discussed in more detail in U.S. patent application Ser. No. 16/386,249, entitled "Multi-Model Sensor Data Association Architecture," incorporated in its entirety herein.

The memory 220 and/or 224 may additionally or alternatively store a mapping system (e.g., generating a map based at least in part on sensor data), a planning system, a ride management system, etc. Although localization component 226, perception component 228, planning component 230, ML model 232, map(s) 234, and/or system controller(s) 236 are illustrated as being stored in memory 220, any of these components may include processor-executable instructions, machine-learned model(s) (e.g., a neural network), and/or hardware and all or part of any of these components may be stored on memory 224 or configured as part of computing device(s) 214.

As described herein, the localization component 226, the perception component 228, the planning component 230, the ML model 232, and/or other components of the system 200 may comprise one or more ML models. For example, the localization component 226, the perception component 228, the planning component 230, and/or the ML model 232 may each comprise different ML model pipelines. In some examples, an ML model may comprise a neural network. An exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAD), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, and the like. In some examples, the ML model discussed herein may comprise PointPillars, SECOND, top-down feature layers (e.g., see U.S. patent application Ser. No. 15/963,833, which is incorporated in its entirety herein), and/or VoxelNet. Architecture latency optimizations may include MobilenetV2, Shufflenet, Channelnet, Peleenet, and/or the like. The ML model may comprise a residual block such as Pixor, in some examples.

In some examples, an ML model may comprise a neural network such as, for example, a convolutional neural network (CNN). As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters. Although discussed in the context of neural networks, any type of machine-learning can be used consistent with this disclosure. In some examples, the ML model 232 discussed herein and/or an ML model may comprise processor-executable instructions stored in a memory of the computing device(s) 204 and/or accessible thereto, hardware, and/or some combination thereof (e.g., a field-programmable gate array (FPGA), application-specific integrated circuit (ASIC)).

Memory 220 may additionally or alternatively store one or more system controller(s) 236, which may be configured to control steering, propulsion, braking, safety, emitters, communication, and other systems of the vehicle 202. These system controller(s) 236 may communicate with and/or control corresponding systems of the drive component(s) 212 and/or other components of the vehicle 202. For example, the planning component 230 may generate instructions based at least in part on perception data generated by the perception component 228 and/or ML model 232, and may validate the perception data and/or path generated by the ML model 232, and/or transmit instructions to the system controller(s) 236. The system controller(s) 236 may control operation of the vehicle 202 based at least in part on the instructions received from the planning component 230.

It should be noted that while FIG. 2 is illustrated as a distributed system, in alternative examples, components of the vehicle 202 may be associated with the computing device(s) 214 and/or components of the computing device(s) 214 may be associated with the vehicle 202. That is, the vehicle 202 may perform one or more of the functions associated with the computing device(s) 214, and vice versa.

Example Processes

Figure 3:
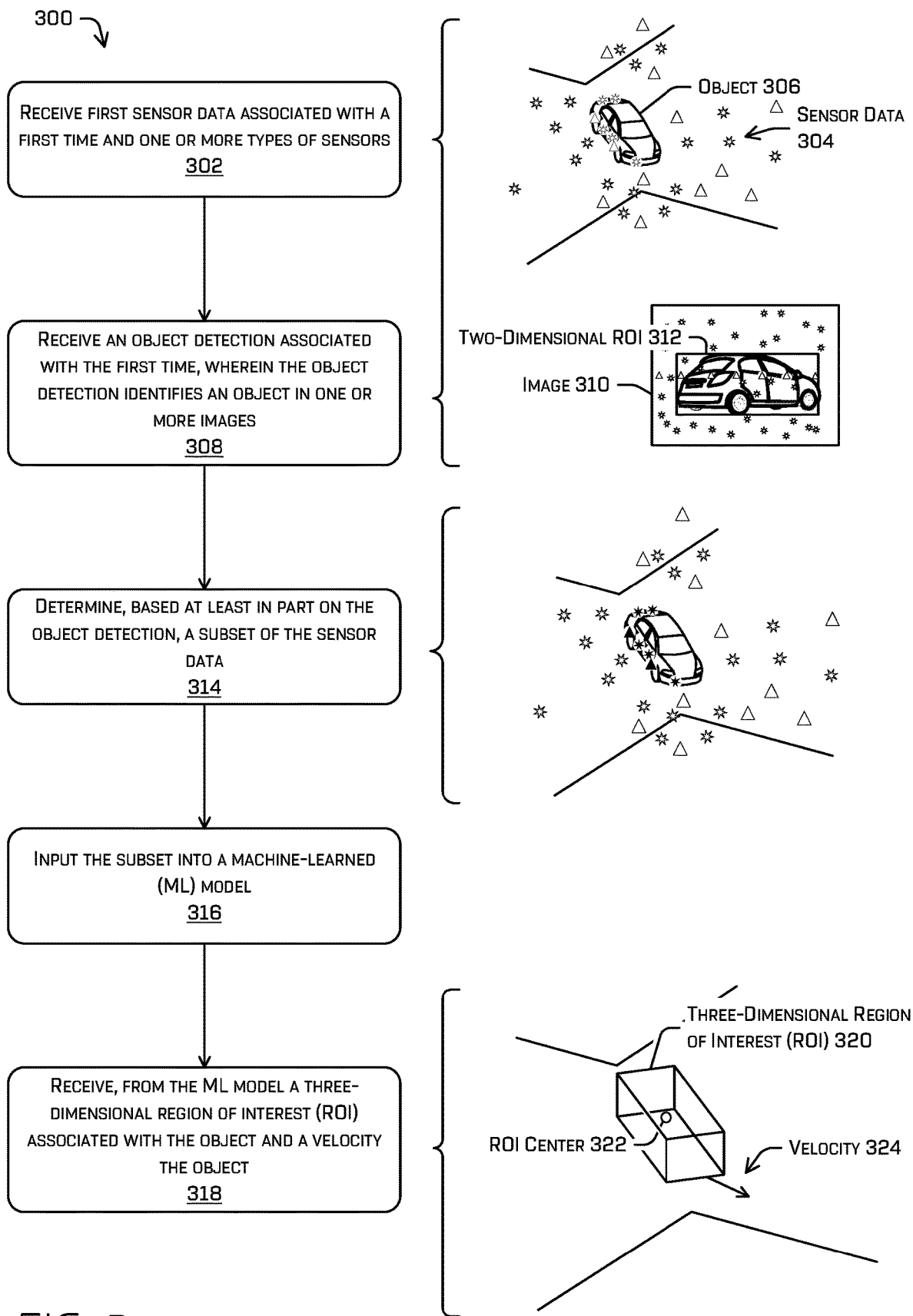
FIG. 3 illustrates a pictorial flow diagram of an example process for detecting an object velocity based at least in part on image data and/or point cloud data when ground truth data is sparse. In some examples, this example process can be used on-vehicle or as part of training the machine-learned model.
Figure 4:
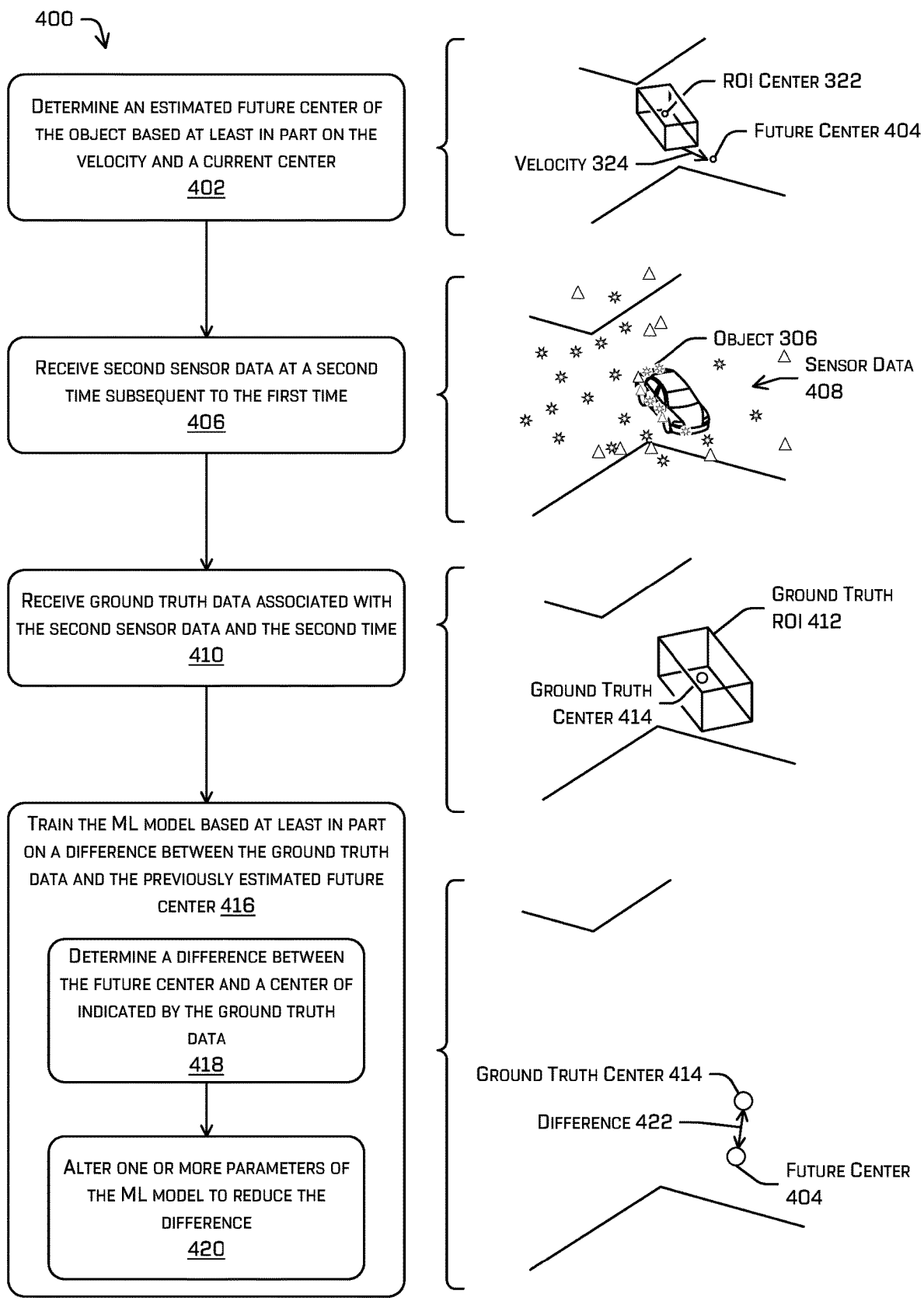
FIG. 4 illustrates a pictorial flow diagram of an example process for training the machine-learned model discussed herein to detect an object's velocity when ground truth data is sparse.

FIGS. 3 and 4 illustrate example process 300 and example process 400 respectively. In some examples, inference use of the ML model may comprise the entirety of example process 300, whereas training the ML model discussed herein may comprise at least part of example process 300 (e.g., at least operations 316 and 318) and may additionally include example process 400. In some examples, the ML architecture 232 and/or other components of a perception component 228 and/or training component may accomplish any of the operation discussed herein. Additionally or alternatively, the example process 300 and/or example process 400 may include more or less operations, may repeat operations, and/or may conduct the operations in a different order than the order in which the operations are depicted in FIGS. 3 and 4. Also, note that FIGS. 3 and 4 and the discussion herein pertains to an example where the ML model is trained to output a velocity and at least a current center of an object, although it is understood that the ML model may At operation 302, example process 300 may comprise receiving first sensor data associated with a first time and one or more types of sensors, according to any of the techniques discussed herein. In some examples, the first sensor data may be associated with two or more types of sensors such as, for example, image data and at least one of lidar data, radar data, ToF data, depth camera data, and/or the like. In some examples, the first sensor data may be received from the different sensor modalities at substantially the same time and/or transmitted in publish-subscribe (pubsub) network at substantially the same time, associated in a same publish-subscribe message, and/or associated with a same index that associated sensor data from different sensor devices and/or modalities.

For example, FIG. 3 depicts sensor data 304 comprising a point cloud generated based at least in part on the output of at least two sensor types and an object 306 in the environment scanned by the two or more sensor types.

At operation 308, example process 300 may comprise receiving an object detection associated with the first time, according to any of the techniques discussed herein. In some examples, the object detection may be received from another perception component and may identify an object in one or more images. For example, the object detection may comprise a two-dimensional ROI, a depth estimate, a movement state, and/or key locomotor positions associated with the object. FIG. 3 depicts an example image 310 and a two-dimensional ROI 312 that may be at least part of the object detection.

At operation 314, example process 300 may comprise determining, based at least in part on the object detection, a subset of the sensor data, according to any of the techniques discussed herein. For example, operation 314 may comprise projecting the point cloud into an image space associated with the image (e.g., projecting lidar points and/or radar points into image coordinates), or otherwise selecting the points which fall inside the bounds of the detected object (thereby removing the necessity to project onto an image plane). This may include projecting three-dimensional points into two-dimensional projected points (i.e., projections). For example, a pre-processing component may identify, as the subset, the points of the point cloud that correspond to projections thereof that lie within the extents of the object detection (e.g., the points corresponding to projections that lie within ROI 312). Note that FIG. 3 depicts this subset by shading those sensor data points that are part of the subset.

At operation 316, example process 300 may comprise providing the subset of sensor data as input to the ML model and/or the portion of the image data associated with the object, according to any of the techniques discussed herein. In some examples, operation 316 may additionally or alternatively comprise inputting an object classification, movement state associated with the object, key locomotor locations, embeddings or other features associated with the object, previous sensor data, previous perception data, and/or previous ML model output(s) (e.g., for the last n time steps, where n is a positive integer, e.g., 1, 2, 3, 4, 5, or more) to the ML model.

At operation 318, example process 300 may comprise receiving, from the ML model, a three-dimensional ROI and a velocity associated with the object, according to any of the techniques discussed herein. The three-dimensional ROI 320 may comprise a center (ROI center 322), extent (e.g., length, width, and/or height), and/or orientation of an estimated volume occupied by the object. Operation 318 may additionally or alternatively comprise receiving a current center associated with the object, regardless of whether the ML model determines a three-dimensional ROI. In some examples, the ML model may determine the velocity 324 by regression. In an alternate example, the ML model may determine an estimated future center of the object instead of or in addition to determining the velocity 324. In some examples, the velocity 324 may be output in association with the object detection. In some examples, the future center may additionally or alternatively be output in association with the object detection.

FIG. 4 illustrates an example process 400 that may comprise at least some operations for training the ML model. In some examples, training the ML model may comprise at least part of example process 300 in addition to at least part of example process 400.

At operation 402, example process 400 may comprise determining an estimated future center of the object based at least in part on the velocity (e.g., the velocity determined at operation 318) and a current center, according to any of the techniques discussed herein. Determining the estimated future center may be based at least in part on a time interval between the first sensor data and second sensor data (received at operation 406). For example, sensor data may be generated or indexed at a particular frequency. Operation 402 may determine the future center based at least in part on determining a distance and direction from ROI center 322 (i.e., the current ROI center) that may be traveled by the object 306 if the object 306 were to travel at the velocity 324 over the time interval. In some examples, the ML model may additionally or alternatively output an acceleration and the future center 404 may account for the acceleration of the object. In at least one example, the acceleration may be determined based at least in part on historical velocities output by the ML model or the acceleration may be directly regressed by the ML model. In some examples, the ML model may receive sensor data and/or perception data associated with multiple time steps.

Note that in an additional or alternate example, the ML model may regress the future center 404 and the velocity may be estimated at operation 402 instead of the future center 404. In such an example, operation 402 may be a last operation of example process 300 if example process 300 occurs on-vehicle.

At operation 406, example process 400 may comprise receiving sensor data associated with a second time subsequent to the first time, according to any of the techniques discussed herein. The second time may be the future time for which the future center 404 is calculated. For example, the second time may be received at a time interval that is associated with a frequency at which the sensors output sensor data and/or at which the sensor data is amalgamated into one or more pub-sub messages. The second sensor data may be associated with a second time indicated by an index identified in the one or more pub-sub messages by which the second sensor data is delivered. The second sensor data 408 may comprise image data and/or a point cloud that is based at least in part on one or more types of sensor outputs (e.g., lidar, radar, ToF). Note that although the sensor data associated with the first time and the sensor data associated with the second time may be retrieved simultaneously or substantially simultaneously during training since the sensor data may be part of log data. Operation 406 may additionally or alternatively comprise receiving perception data associated with the second sensor data 408, such as an object detection, movement state, key locomotor locations, and/or the like. In some training instances, operation 406 may be omitted.

At operation 410, example process 400 may comprise receiving ground truth data associated with the second sensor data and the second time, according to any of the techniques discussed herein. The ground truth data may comprise a ground truth ROI 412 and/or ground truth center 414, which may be part of the ground truth ROI 412. For example, the ground truth ROI 412 may comprise the ground truth center 414, extent, and/or orientation of the object.

At operation 416, example process 400 may comprise training the ML model based at least in part on a difference between the ground truth data and the previously estimated future center, according to any of the techniques discussed herein. For example, operation 416 may comprise operation(s) 418 and/or 420.

At operation 418, example process 400 may comprise determining a difference between the future center and a center indicated by the ground truth data, according to any of the techniques discussed herein. The future center 404 and the ground truth center 414 may both be associated with the second time. Determining the difference 422 between the future center 404 and the ground truth center 414 may comprise determining a distance between the future center 404 and the ground truth center 414. Determining the difference between the future center 404 and the ground truth center 414 may additionally or alternatively comprise determining an angle subtended by an arc/line between the future center 404 and the ground truth center 414. A loss may be determined based on the difference 422, such as, but not limited to, an L1 loss, an L2 loss, a Huber loss, or the like, which may be determined in accordance with a Laplacian distribution using learned (or determined) covariances.

At operation 420, example process 400 may comprise altering one or more parameters of the ML model to minimize the loss, according to any of the techniques discussed herein. A parameter, in contrast to a hyperparameter, may comprise any parameter that is modified during training such as, for example, a weight associated with a layer or components thereof (e.g., a filter, node). Whereas a hyperparameter may include the number of filters, spatial extent, stride, anchor boxes, layer types, layer connections, input size (e.g., tensor, having dimensions $W_1 \times H_1 \times D_1$, received from a previous stage in the pipeline) and/or type, output size and/or type (e.g., tensor having dimensions having dimensions $W_1 \times H_1 \times D_1$ or $W_2 \times H_2 \times D_2$), etc. Although various examples of hyperparameters are given herein, it is contemplated that one or more of the hyperparameters may be parameters, depending on the training method.

For example, where the ML model comprises a convolutional neural network, altering one or more parameters of the ML model may include modifying one or more weights of a kernel/filter such that the velocity 324 output by the ML model would result in a future center 404 that is closer to the ground truth center 414, thereby reducing the difference 422 therebetween (e.g., the distance between future center 404 and ground truth center 414, the angle subtended by the line between future center 404 and ground truth center 414). In this manner, even though ground truth data isn't available for the velocity 324 itself or the time step for which the velocity was output, the ML model is trained.

Additional or Alternate Example Process

Figure 5:
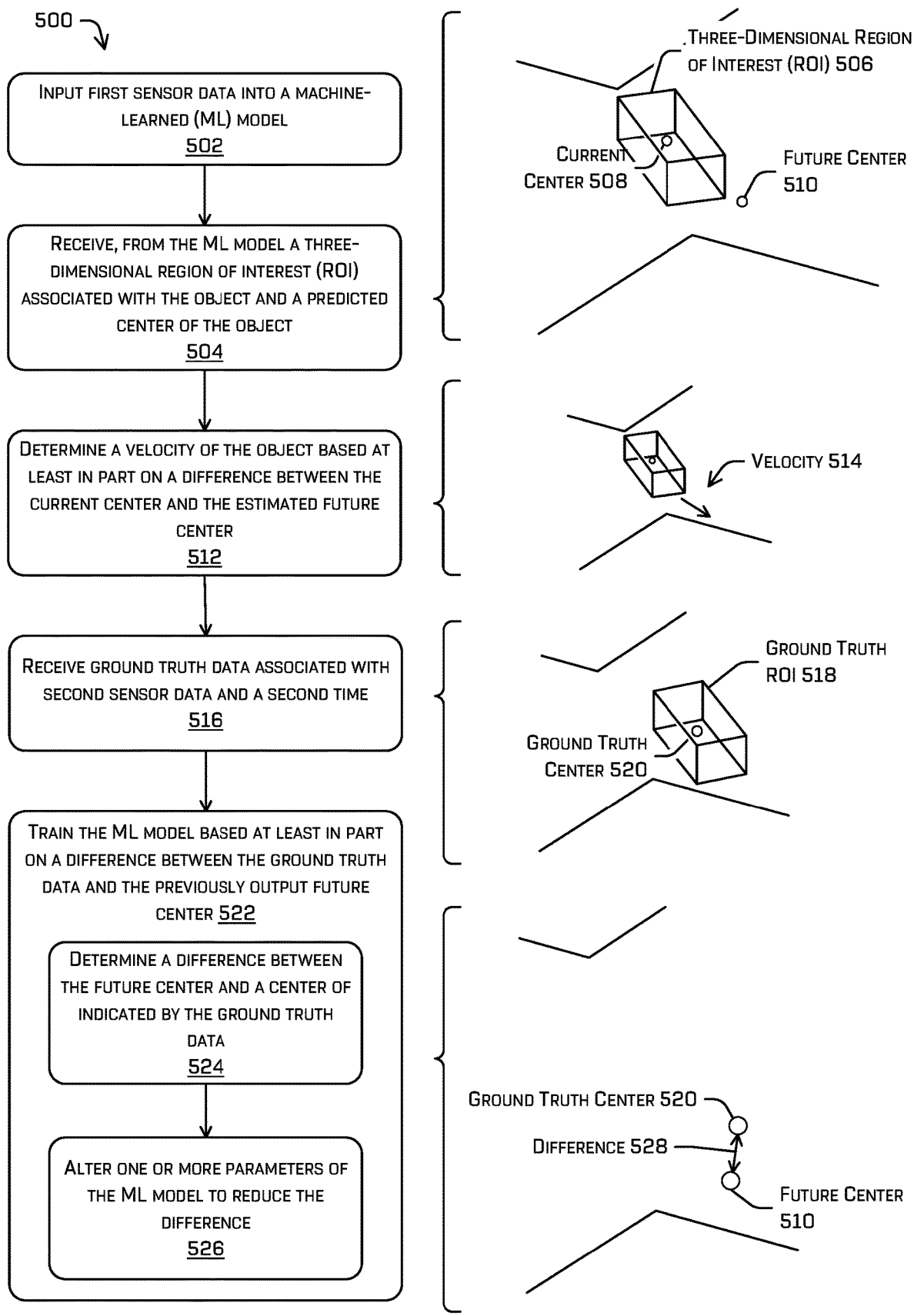
FIG. 5 illustrates a pictorial flow diagram of an alternate example process for detecting an object velocity based at least in part on image data and/or point cloud data and/or training a machine-learned model when ground truth data is sparse.

FIG. 5 illustrates a pictorial flow diagram of an alternate example process, example process 500, for detecting an object velocity based at least in part on image data and/or point cloud data and/or training a machine-learned model when ground truth data is sparse. Example process 500 is an example of a training process where the ML model determines a future center in addition to or instead of a velocity. In such an example, the velocity may be determined based at least in part on a current center, the future center, and a time interval between the current time and the time associated with the future center. In some examples, a computing device conducting ML model training may conduct at least part of example process 500.

At operation 502, example process may comprise inputting first sensor data into the ML model, according to any of the techniques discussed herein. For example, the first sensor data may be a subset of first data, as determined based at least in part on operations 302, 308, and 314.

At operation 504, example process may comprise receiving, from the three-dimensional ROI associated with the object and a future center of the object, according to any of the techniques discussed herein. The three-dimensional ROI 506 may comprise a current center 508. The future center 510 may be an estimated future position of the center of the object represented by the three-dimensional ROI 506.

At operation 512, example process may comprise determining a velocity of the object based at least in part on a difference between the current center and the estimated future center, according to any of the techniques discussed herein. For example, determining the velocity 514 may be based at least in part on determining a distance and/or direction between the future center 510 and the current center 508 over a time interval. The time interval may be a time interval associated with a frequency at which the sensor data is generated/transmitted/received. The time interval may be a time interval between the first time and the second time. In some examples, the velocity 514 may be output in association with the object detection (e.g., an image and/or lidar/radar object detection). In some examples, the future center may additionally or alternatively be output in association with the object detection.

At operation 516, example process may comprise receiving ground truth data associated with second sensor data and a second time, according to any of the techniques discussed herein. For example, the ground truth data may comprise a ground truth ROI 518 indicating the volume of space occupied by the object at the second time. The ground truth ROI 518 may comprise a ground truth center 520 indicating a location of the center of the object at the second time.

At operation 522, example process 500 may comprise training the ML model based at least in part on a difference between the ground truth data and the previously output future center, according to any of the techniques discussed herein. For example, operation 522 may comprise operation(s) 524 and/or 526.

At operation 524, example process 500 may comprise determining a difference between the future center and a center indicated by the ground truth data, according to any of the techniques discussed herein. The future center 510 and the ground truth center 520 may both be associated with the second time. Operation 524 may be the same or similar to operation 418.

At operation 526, example process 500 may comprise altering one or more parameters of the ML model to reduce the difference 528, according to any of the techniques discussed herein.

Example Clauses

A. A method comprising: receiving sensor data associated with a first time, the sensor data comprising point cloud data and image data representing a portion of an environment surrounding an autonomous vehicle; receiving an object detection associated with the first time, wherein the object detection identifies an object in the image data; determining, based at least in part on the object detection, a first subset of the sensor data comprising a portion of the image data and a portion of the point cloud data; inputting the first subset of the sensor data into a machine-learned (ML) model; receiving, from the ML model, an output; determining, based at least in part on the output, a velocity associated with the object; determining, based at least in part on at least one of the output or the velocity, a predicted location of the object at a second time after the first time; receiving ground truth data indicative of a three-dimensional ROI associated with the object and the second time; determining a difference between the predicted location and a center of the three-dimensional ROI; altering one or more parameters of the ML model based at least in part on the difference; and transmitting the ML model to a vehicle to control motion of the vehicle.

B. The method of paragraph A, wherein inputting the first subset of sensor data further comprises inputting one or more of: a classification associated with the object, a track associated with the object, a motion state associated with the object, or a doppler velocity associated with the object.

C. The method of either paragraph A or B, wherein the output comprises the velocity and a second three-dimensional ROI and determining the predicted location comprises: projecting a center of the second three-dimensional ROI forward based at least in part on the velocity.

D. The method of any one of paragraphs A-C, wherein the output comprises the predicted location and a second three-dimensional ROI and determining the velocity is based at least in part on a distance between the predicted location and a center of the second three-dimensional ROI.

E. The method of any one of paragraphs A-D, wherein altering the parameters comprises determining an L1 loss based on the difference and a learned covariance value.

F. A system comprising: one or more processors; and a memory storing processor-executable instructions that, when executed by the one or more processors, cause the system to perform operations comprising: receiving sensor data associated with a first time, the sensor data comprising point cloud data and image data representing a portion of an environment surrounding an autonomous vehicle and the sensor data being associated with an object in the environment; inputting the sensor data into a machine-learned (ML) model; receiving, from the ML model, an output; determining, based at least in part on the output, a velocity associated with the object; determining, based at least in part on at least one of the output or the velocity, a predicted location of the object at a second time after the first time; receiving ground truth data indicative of a three-dimensional ROI associated with the object and the second time; determining a difference between the predicted location and a center of the three-dimensional ROI; altering one or more parameters of the ML model based at least in part on the difference; and transmitting the ML model to a vehicle to control motion of the vehicle.

G. The system of paragraph F, wherein inputting the first subset of sensor data further comprises inputting one or more of: a classification associated with the object, a track associated with the object, a motion state associated with the object, or a doppler velocity associated with the object.

H. The system of either paragraph F or G, wherein the output comprises the velocity and a second three-dimensional ROI and determining the predicted location comprises: projecting a center of the second three-dimensional ROI forward based at least in part on the velocity.

I. The system of any one of paragraphs F-H, wherein the output comprises the predicted location and a second three-dimensional ROI and determining the velocity is based at least in part on a distance between the predicted location and a center of the second three-dimensional ROI.

J. The system of any one of paragraphs F-I, wherein altering the parameters comprises determining an L1 loss based on the difference and a learned covariance value.

K. The system of any one of paragraphs F-J, wherein: the object detection further comprises an indication that the object is a pedestrian and a movement state of the pedestrian; and determining the velocity is further based at least in part on the movement state.

L. The system of paragraph K, wherein the movement state comprises standing, sitting, lying, walking, or running.

M. The system of any one of paragraphs F-L, wherein the object detection further comprises: one or more locations of key portions of the pedestrian; and determining the velocity is further based at least in part on the one or more locations.

N. A non-transitory computer-readable medium storing processor-executable instructions that, when executed by one or more processors, cause the one or more processors to perform operations comprising: receiving sensor data associated with a first time, the sensor data comprising point cloud data and image data representing a portion of an environment surrounding an autonomous vehicle and the sensor data being associated with an object in the environment; inputting the sensor data into a machine-learned (ML) model; receiving, from the ML model, a first three-dimensional region of interest (ROI) and a velocity associated with the object; determining, based at least in part on the velocity and the first three-dimensional ROI, a predicted location of the object at a second time after the first time; receiving ground truth data indicative of a second three-dimensional ROI associated with the object and the second time; determining a difference between the predicted location and a center of the second three-dimensional ROI; and altering one or more parameters of the ML model based at least in part on the difference.

O. The non-transitory computer-readable medium of paragraph N, wherein inputting the first subset of sensor data further comprises inputting one or more of: a classification associated with the object, a track associated with the object, a motion state associated with the object, or a doppler velocity associated with the object.

P. The non-transitory computer-readable medium of either paragraph N or O, wherein inputting the first subset of sensor data further comprises inputting one or more of: a classification associated with the object, a track associated with the object, a motion state associated with the object, or a doppler velocity associated with the object.

Q. The non-transitory computer-readable medium of any one of paragraphs N-P, wherein the output comprises the velocity and a second three-dimensional ROI and determining the predicted location comprises: projecting a center of the second three-dimensional ROI forward based at least in part on the velocity.

R. The non-transitory computer-readable medium of any one of paragraphs N-Q, wherein the output comprises the predicted location and a second three-dimensional ROI and determining the velocity is based at least in part on a distance between the predicted location and a center of the second three-dimensional ROI.

S. The non-transitory computer-readable medium of any one of paragraphs N-R, wherein: the object detection further comprises an indication that the object is a pedestrian and a movement state of the pedestrian; and determining the velocity is further based at least in part on the movement state.

T. The non-transitory computer-readable medium of paragraph S, wherein the movement state comprises standing, sitting, lying, walking, or running.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

At least some of the processes discussed herein are illustrated as logical flow graphs, each operation of which represents a sequence of operations that can be implemented in hardware, software, or a combination thereof. In the context of software, the operations represent computer-executable instructions stored on one or more non-transitory computer-readable storage media that, when executed by one or more processors, cause a computer or autonomous vehicle to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art. Note that the term substantially may indicate a range. For example, substantially simultaneously may indicate that two activities occur within a time range of each other, substantially a same dimension may indicate that two elements have dimensions within a range of each other, and/or the like.

Many variations and modifications may be made to the above-described examples, the elements of which are to be understood as being among other acceptable examples. All such modifications and variations are intended to be included herein within the scope of this disclosure and protected by the following claims.

What is claimed is:

1. A method comprising:
   receiving sensor data associated with a first time, the sensor data comprising point cloud data and image data representing a portion of an environment surrounding an autonomous vehicle;
   receiving an object detection associated with the first time, wherein the object detection identifies an object in the image data;
   determining, based at least in part on the object detection, a first subset of the sensor data comprising a portion of the image data and a portion of the point cloud data;
   inputting the first subset of the sensor data into a machine-learned (ML) model;
   receiving, from the ML model, an output;
   determining, based at least in part on the output, a velocity associated with the object;
   determining, based at least in part on at least one of the output or the velocity, a predicted location of the object at a second time after the first time;
   receiving ground truth data indicative of a three-dimensional ROI associated with the object and the second time;
   determining a difference between the predicted location and a center of the three-dimensional ROI;
   altering one or more parameters of the ML model based at least in part on the difference; and
   transmitting the ML model to a vehicle to control motion of the vehicle.

2. The method of claim 1, wherein inputting the first subset of sensor data further comprises inputting one or more of:
   a classification associated with the object,
   a track associated with the object,
   a motion state associated with the object, or
   a doppler velocity associated with the object.

3. The method of claim 1, wherein the output comprises the velocity and a second three-dimensional ROI and determining the predicted location comprises:
   projecting a center of the second three-dimensional ROI forward based at least in part on the velocity.

4. The method of claim 1, wherein the output comprises the predicted location and a second three-dimensional ROI and determining the velocity is based at least in part on a distance between the predicted location and a center of the second three-dimensional ROI.

5. The method of claim 1, wherein altering the one or more parameters comprises determining an L1 loss based on the difference and a learned covariance value.

6. A system comprising:
   one or more processors; and
   a memory storing processor-executable instructions that, when executed by the one or more processors, cause the system to perform operations comprising:
   receiving sensor data associated with a first time, the sensor data comprising point cloud data and image data representing a portion of an environment surrounding an autonomous vehicle and the sensor data being associated with an object in the environment;
   inputting the sensor data into a machine-learned (ML) model;
   receiving, from the ML model, an output;
   determining, based at least in part on the output, a velocity associated with the object;
   determining, based at least in part on at least one of the output or the velocity, a predicted location of the object at a second time after the first time;
   receiving ground truth data indicative of a three-dimensional ROI associated with the object and the second time; determining a difference between the predicted location and a center of the three-dimensional ROI;
   altering one or more parameters of the ML model based at least in part on the difference; and
   transmitting the ML model to a vehicle to control motion of the vehicle.

7. The system of claim 6, wherein inputting the first subset of sensor data further comprises inputting one or more of:
- a classification associated with the object,
- a track associated with the object,
- a motion state associated with the object, or
- a doppler velocity associated with the object.

8. The system of claim 6, wherein the output comprises the velocity and a second three-dimensional ROI and determining the predicted location comprises:
- projecting a center of the second three-dimensional ROI forward based at least in part on the velocity.

9. The system of claim 6, wherein the output comprises the predicted location and a second three-dimensional ROI and determining the velocity is based at least in part on a distance between the predicted location and a center of the second three-dimensional ROI.

10. The system of claim 6, wherein altering the one or more parameters comprises determining an L1 loss based on the difference and a learned covariance value.

11. The system of claim 6, wherein:
- the operations further comprise receiving an object detection identifying the sensor data as being associated with the object;
- the object detection further comprises an indication that the object is a pedestrian and a movement state of the pedestrian; and
- determining the velocity is further based at least in part on the movement state.

12. The system of claim 11, wherein the movement state comprises standing, sitting, lying, walking, or running.

13. The system of claim 11, wherein the object detection further comprises:
- a location of a particular portion of the pedestrian; and
- determining the velocity is further based at least in part on the location.

14. A non-transitory computer-readable medium storing processor-executable instructions that, when executed by one or more processors, cause the one or more processors to perform operations comprising:
- receiving sensor data associated with a first time, the sensor data comprising point cloud data and image data representing a portion of an environment surrounding an autonomous vehicle and the sensor data being associated with an object in the environment;
- inputting the sensor data into a machine-learned (ML) model;
- receiving, from the ML model, a first three-dimensional region of interest (ROI) and a velocity associated with the object;
- determining, based at least in part on the velocity and the first three-dimensional ROI, a predicted location of the object at a second time after the first time;
- receiving ground truth data indicative of a second three-dimensional ROI associated with the object and the second time;
- determining a difference between the predicted location and a center of the second three-dimensional ROI; and
- altering one or more parameters of the ML model based at least in part on the difference.

15. The non-transitory computer-readable medium of claim 14, wherein inputting the sensor data further comprises inputting one or more of:
- a classification associated with the object,
- a track associated with the object,
- a motion state associated with the object, or
- a doppler velocity associated with the object.

16. The non-transitory computer-readable medium of claim 14, wherein the output comprises the velocity and a second three-dimensional ROI and determining the predicted location comprises:
- projecting a center of the second three-dimensional ROI forward based at least in part on the velocity.

17. The non-transitory computer-readable medium of claim 14, wherein the output comprises the predicted location and a second three-dimensional ROI and determining the velocity is based at least in part on a distance between the predicted location and a center of the second three-dimensional ROI.

18. The non-transitory computer-readable medium of claim 14, wherein:
- the operations further comprise receiving an object detection identifying the sensor data as being associated with the object;
- the object detection further comprises an indication that the object is a pedestrian and a movement state of the pedestrian; and
- determining the velocity is further based at least in part on the movement state.

19. The non-transitory computer-readable medium of claim 18, wherein the movement state comprises standing, sitting, lying, walking, or running.

20. the non-transitory computer-readable medium of claim 18, wherein the object detection further comprises:
- a location of a particular portion of the pedestrian; and
- determining the velocity is further based at least in part on the location.

* * * * *